Patented Jan. 16, 1923.

1,442,773

UNITED STATES PATENT OFFICE.

HAROLD A. RICHMOND AND ROBERT MACDONALD, JR., OF NIAGARA FALLS, NEW YORK, ASSIGNORS TO GENERAL ABRASIVE COMPANY, INC., OF NIAGARA FALLS, NEW YORK, A CORPORATION OF NEW YORK.

HOMOGENEOUS CRYSTALLINE PRODUCT AND METHOD OF MAKING THE SAME.

No Drawing. Application filed April 25, 1922. Serial No. 556,537.

*To all whom it may concern:*

Be it known that we, HAROLD A. RICHMOND and ROBERT MACDONALD, Jr., citizens of the United States, residing at Niagara Falls, in the county of Niagara and State of New York, have jointly invented a new and useful Improvement in Homogeneous Crystalline Products and Methods of Making the Same, of which the following is a specification.

Our invention provides a new composition of matter containing oxides of boron, aluminum, silicon, titanium and iron and useful for refractory, electric and heat insulating, abrasive and other purposes.

A product having the desired percentages of the oxides of boron, aluminum, silicon, titanium and iron, may be prepared by mixing these several oxides and fusing them in a suitable furnace. Since a temperature of about 4000° F. is required, an electric furnace of the arc type, with suspended electrodes, may be conveniently used. Upon cooling, the product crystallizes. We have prepared in this way a product containing substantially $90\frac{1}{2}\%$ alumina, 2% silica, 1% iron oxide, $4\frac{1}{2}\%$ titanium oxide, and 2% boric oxide. This product has a blackish brown color and is characterized by great hardness, density and toughness. When crushed it breaks down into translucent polyhedral grains approaching small spheres in shape. These characteristics particularly adapt it for polishing and for many kinds of rough grinding. Its high melting point adapts it for furnace linings of the most refractory character. In granular form its low electrical conductivity makes it useful for insulating purposes as in electric sad irons, percolators, heating rolls and other electric devices.

We do not limit our invention to the percentages of different oxides above named. Increasing the percentage of titanium oxide and boric acid darkens the color and increases the toughness and density of the product. The iron and silica may vary within considerable limits without impairing the quality of the product.

This product may be prepared in other ways as by adding a titaniferous ore and boric acid to an impure oxide of aluminum, such as bauxite, diaspore or emery, all of which contain silica and iron oxide. If the proportions of silica and iron oxide present in the bauxite is larger than is wanted in the finished product, a part of these easily reducible oxides may be reduced in the furnace by adding sufficient coke or carbon in other form, and this may be accomplished without any substantial reduction of the alumina, and relatively little reduction of titanium oxide. There is a commercial advantage in preparing our product in this manner, due to the lesser cost of the raw materials.

In preparing our product the ingredients may be mixed together in any order, but we prefer to mix bauxite which has previously been broken into small lumps with boric acid or other compound of boron and thoroughly calcine the mixture. To this we add ilmenite or other titaniferous ore, steel chips, and coke. The coke is added to reduce the excess of silica and iron oxide usually present in bauxite. Enough steel chips are used to make a magnetic ferrosilicon from the products of reduction. If the bauxite contains sufficient iron oxide to produce such a ferrosilicon, it is unnecessary to add to the charge the steel chips or iron in other form. We use the following proportions, which however must be varied according to the composition of the bauxite and the percentage of each oxide desired in the product.

| | |
|---|---|
| Bauxite, calcined | 100 lbs. |
| Boric acid | 5 lbs. |
| Illmenite | 2 lbs. |
| Steel chips | 10 lbs. |
| Coke | 7 lbs. |

The charge is fed gradually into the electric furnace which may be of the box type with suspended electrodes. A crust of unfused charge is maintained on the top of the charge to minimize radiation. It is important, in order to obtain a uniform product, that the melting shall not be unduly hastened. After substantially all the charge is melted the current is shut off, the electrodes withdrawn and the molten material allowed to cool slowly, preferably, but not necessarily, within the furnace. So much of the silica and iron oxide as has been reduced will unite with the melted steel chips to form a magnetic ferrosilicon, which will also contain a small percentage of titanium. This ferrosilicon is removed after the cooled mass is broken up, either by hand picking, magnets, or otherwise. The product obtained, when using the above proportions, has substantially the composition named in the second paragraph of this specification.

Besides having a beneficial effect on the qualities of the product as mentioned above, the boric acid acts as a flux and thereby reduces the amount of energy required to melt the charge. Furthermore it assists in the reduction of the excess silica and iron oxide. The oxide of titanium also facilitates this reduction by standing between the carbon of the coke and the oxygen of the alumina, thus helping to prevent the formation of objectionable aluminum carbide.

We claim:

1. The herein described homogeneous crystalline product composed essentially of the oxides of boron, aluminum, silicon, iron, and titanium.

2. The herein described homogeneous crystalline product composed of the oxides of boron, aluminum, silicon, iron and titanium, substantially free from impurities.

3. The herein described homogeneous crystalline product composed essentially of the oxides of boron, aluminum, silicon, iron and titanium, and characterized by great hardness, solidity, resistance to facture and fine crystallization.

4. The herein described method of producing a homogeneous, crystalline material composed essentially of the oxides of boron, aluminum, silicon, iron and titanium, which consists in fusing together materials containing said oxides.

5. The herein described method of producing a homogeneous crystalline product composed essentially of the oxides of boron, aluminum, silicon, iron and titanium, which consists in fusing materials containing such oxdes and reducing the excess silica and iron oxide.

6. The herein described process of producing a homogeneous crystalline product which consists in mixing bauxite, a titaniferous ore, boric acid and coke, melting the mixture in an electric furnace, and allowing the mass to cool.

7. The herein described process of producing a homogeneous crystalline product which consists in mixing an impure oxide of aluminum containing silica and iron oxide, a compound of titanium, and a compound of boron, melting the mixture in an electric furnace, and allowing the mass to cool.

8. The herein described process of producing a homogeneous crystalline product which consists in mixing an impure oxide of aluminum containing silica and iron oxide, a compound of titanium, a compound of boron, and coke, melting the same by means of electrically developed heat, reducing a part of the silica and iron oxide, and allowing the mass to cool.

HAROLD A. RICHMOND.
ROBERT MACDONALD, Jr.